US011652269B2

(12) United States Patent
Crespo Menéndez et al.

(10) Patent No.: US 11,652,269 B2
(45) Date of Patent: May 16, 2023

(54) ARTICULATED MECHANISM AND ARTICULATED AIMING SYSTEM COMPRISING THE MECHANISM

(71) Applicant: AIRBUS DEFENCE AND SPACE S.A., Madrid (ES)

(72) Inventors: Carlos Crespo Menéndez, Madrid (ES); Alejandro Garcés De Marcilla Rodriguez, Madrid (ES)

(73) Assignee: AIRBUS DEFENCE AND SPACE S.A., Madrid (ES)

( * ) Notice: Subject to any disclaimer, the term of this patent is extended or adjusted under 35 U.S.C. 154(b) by 257 days.

(21) Appl. No.: 17/285,662

(22) PCT Filed: Oct. 17, 2018

(86) PCT No.: PCT/ES2018/070678
§ 371 (c)(1),
(2) Date: Apr. 15, 2021

(87) PCT Pub. No.: WO2020/079290
PCT Pub. Date: Apr. 23, 2020

(65) Prior Publication Data
US 2021/0399403 A1 Dec. 23, 2021

(51) Int. Cl.
*H01Q 1/12* (2006.01)
*H01Q 1/18* (2006.01)
(Continued)

(52) U.S. Cl.
CPC ........... *H01Q 1/125* (2013.01); *F16M 11/123* (2013.01); *F16M 11/14* (2013.01); *H01Q 1/18* (2013.01); *H01Q 3/08* (2013.01)

(58) Field of Classification Search
CPC .......... H01Q 1/125; H01Q 1/18; H01Q 1/288; H01Q 1/12; H01Q 1/1257; H01Q 1/1264;
(Continued)

(56) References Cited

U.S. PATENT DOCUMENTS

2014/0174214 A1  6/2014  Horth et al.

FOREIGN PATENT DOCUMENTS

| EP | 2608313 A1 | 6/2013 |
| JP | H04-266203 A | 9/1992 |
| WO | 2011/104038 A1 | 9/2011 |

OTHER PUBLICATIONS

International Search Report for PCT/ES2018/070678, dated Jul. 19, 2019.

*Primary Examiner* — Robert Karacsony
(74) *Attorney, Agent, or Firm* — Merchant & Gould P.C.

(57) ABSTRACT

An articulated mechanism is included in an articulated pointing system. The articulated mechanism includes first, second, and third spherical joints, and a first, second, and third lever. The first and second spherical joints are linked by the first lever. The first lever includes a first projecting portion. The first and third spherical joints are linked by the second lever, the second lever including a second projecting portion projecting in an opposite direction of the first projecting portion. The second and third spherical joints are linked by the third lever, such that the longitudinal axes of the first lever and of the second lever are perpendicular. The articulated pointing system includes a basement platform and a mobile platform joined by two articulated hinges. The hinges are moved by actuators. The articulated mechanism has the first lever attached to the mobile platform and the second lever attached to the basement platform.

5 Claims, 4 Drawing Sheets

(51) Int. Cl.
*H01Q 3/08* (2006.01)
*F16M 11/14* (2006.01)
*F16M 11/12* (2006.01)

(58) Field of Classification Search
CPC ............ H01Q 3/005; H01Q 3/02; H01Q 3/04; H01Q 3/06; H01Q 3/08; H01Q 3/10; F16M 11/123; F16M 11/121; F16M 11/046; F16M 11/14; F16M 11/18; F16M 11/02; F16M 11/04; F16M 11/06; F16M 11/12; F16C 2326/47; B64G 1/66
See application file for complete search history.

ARTICULATED MECHANISM AND ARTICULATED AIMING SYSTEM COMPRISING THE MECHANISM

This application is a National Stage of PCT/ES2018/070678, filed Oct. 17, 2018, which application is incorporated herein by reference. To the extent appropriate, a claim of priority is made to the above-disclosed application.

FIELD OF THE INVENTION

The present invention relates to the field of articulated mechanisms and pointing systems and is more particularly related to antenna pointing systems.

BACKGROUND OF THE INVENTION

In the aerospace industry it is usual to incorporate reflector antennas in telecommunication satellites. It is also common to use mechanisms for the pointing of such reflector antennas.

JP H04266203 A refers to a "Mount for antenna system". The support base for supporting an antenna device for receiving satellite broadcasting comprises a first base and a second base. A horizontal direction position detection means is provided to the first base, and the first base is supported by a shaft prolonged from a ball bearing provided to the second base. First and second cam means and a control means are used to drive the first and/or second motors in response to a detection output from the position detection means to keep the first base horizontal. In this system the central pivoting point is a spherical articulation and the actuators are in the main load path.

WO 2011/104038 A1 refers to a "Gear mechanism". In a first embodiment, the gear mechanism takes the form of a multiple joint, in which the connection elements are adjustable in relation to another in a translatory manner and with respect to their angle. In a second embodiment, a gear mechanism of a simplified form is provided, a form in which the connection elements are merely adjustable with respect to their angular position, that is to say a gear mechanism for transmitting a movement between two relatively eccentrically mounted connection elements with a bearing element, which is arranged between the connection elements, and with a spacing element of fixed dimensions, which can be positioned between the connection elements at a distance from the bearing element in such a controlled manner that the connection elements assume a desired angular position in relation to one another while being supported on the spacing element and the bearing element. A number of gear mechanisms according to this invention can be put together to form a flexible joint or a manipulation arm. This system has no central spherical or cardan articulation, and the actuators are in the main load path.

EP 2608313 A1 refers to an "Antenna pointing system" for selectively moving a payload relative to a mounting surface and includes at least one rotary actuator having a moving part movable relative to a fixed part mounted on the surface. A connecting rod movably connects to the moving part and to the payload. A flexible mounting structure movably attaches the payload to the mounting surface. This system has a conventional cardan joint but not a central cardan articulation, and the actuators are in the main load path.

Although many articulated pointing systems have been developed, there is still a need to improve the accuracy in obtaining the position and in the definition of the rotation axes.

SUMMARY OF THE INVENTION

Accordingly, the object of the present invention is to provide an articulated mechanism and an articulated pointing system that avoids the mentioned drawbacks.

The invention provides an articulated mechanism, that comprises a first spherical joint, a second spherical joint, a third spherical joint, a first lever, a second lever, and a third lever, wherein the first spherical joint and the second spherical joint are linked by the first lever, the first lever comprising a first projecting portion; the first spherical joint and the third spherical joint are linked by the second lever, the second lever comprising a second projecting portion projecting in an opposite direction to the direction in which the first projecting portion projects; and the second spherical joint and the third spherical joint are linked by the third lever, such that the longitudinal axis Y of the first lever and the longitudinal axis X of the second lever are perpendicular.

The invention also provides an articulated pointing system, comprising a basement platform and a mobile platform which is movable with respect to the basement platform; two articulated hinge means that join the basement platform and the mobile platform, the movement of the hinge means being performed by actuators; and an articulated mechanism of the invention in which the first lever is attached to the mobile platform by means of the first projecting portion and the second lever is attached to the basement platform by means of the second projecting portion.

By means of the configuration of the articulated mechanism, the rotation axes are defined by two points (the centres of the spherical joints) and there is no uncertainty in their definition, achieving greater precision in the knowledge of the position of the rotation axes, both theoretical and operative.

Other characteristics and advantages of the present invention will be clear from the following detailed description of several embodiments illustrative of its object in relation to the attached figures.

DETAILED DESCRIPTION OF THE INVENTION

Figure 1:
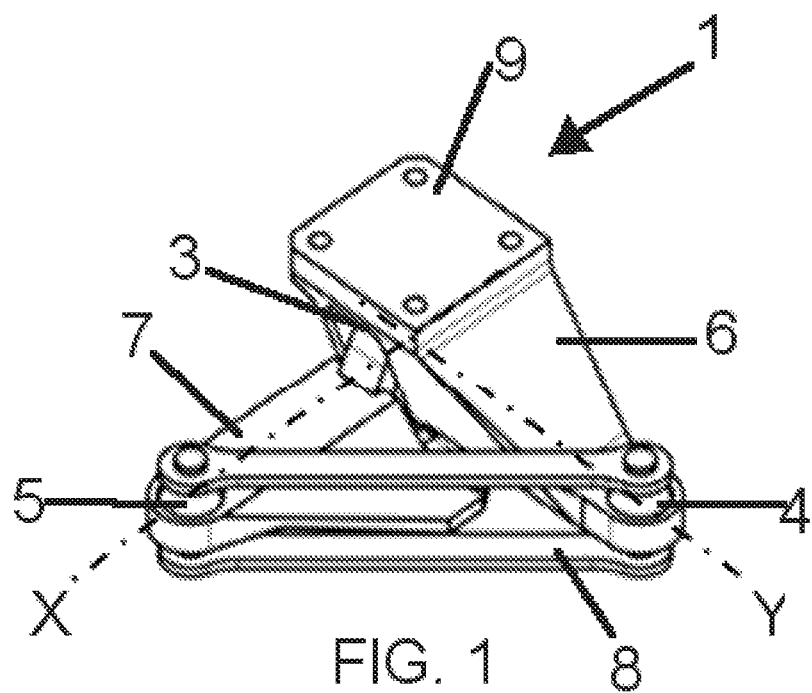
FIG. 1 shows a perspective view of the articulated mechanism of the invention.
Figure 2:
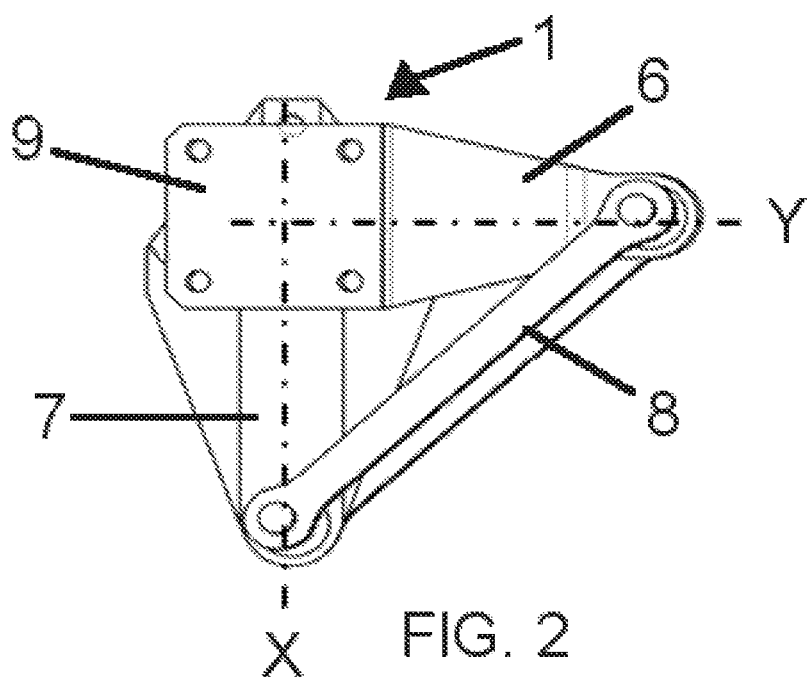
FIG. 2 shows a plan view of the articulated mechanism of the invention.
Figure 3:
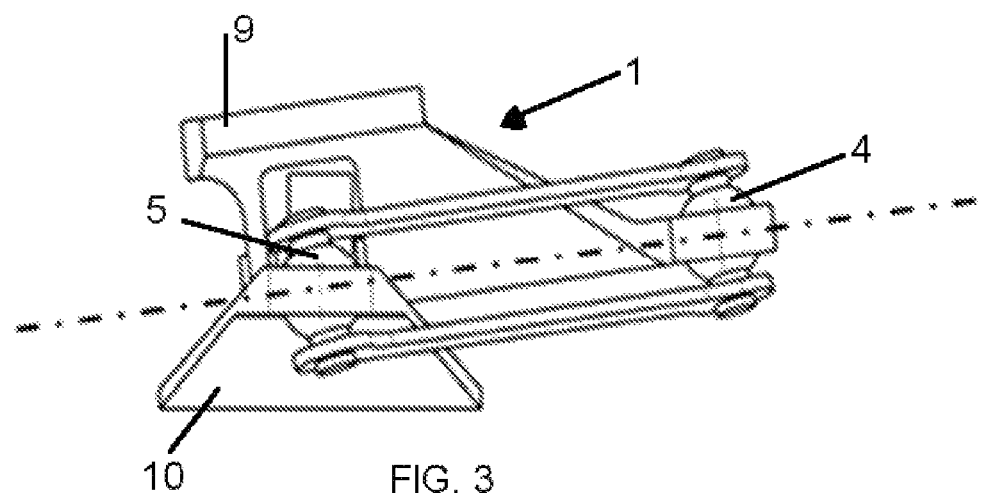
FIG. 3 shows a perspective bottom view of the articulated mechanism of the invention.

The articulated mechanism 1 of the invention is represented in FIGS. 1 to 3. In these figures it can be seen that the articulated mechanism 1 comprises a first spherical joint 3, a second spherical joint 4, a third spherical joint 5, a first lever 6, a second lever 7 and a third lever 8. The first spherical joint 3 and the second spherical joint 4 are linked by the first lever 6, which comprises a first projecting portion 9 suitable to be attached to a first surface. In FIGS. 1 and 2 the projecting portion 9 of the first lever 6 is arranged at the end of the first lever 6 corresponding to the first spherical joint 3.

The first spherical joint 3 and the third spherical joint 5 are linked by the second lever 7, which comprises a second projecting portion 10 suitable to be attached to a second surface. In FIGS. 1 and 3 the projecting portion 10 of the second lever 7 is arranged at the end of the second lever 7 corresponding to the first spherical joint 3.

In FIGS. 1 to 3 it can be seen that the second spherical joint 4 and the third spherical joint 5 are linked by the third lever 8, in such a way that the longitudinal axis Y of the first lever 6 and the longitudinal axis X of the second lever 7 are perpendicular.

The second projecting portion 10 projects in an opposite direction to the direction in which the first projecting portion 9 projects.

In the embodiment of the articulated mechanism 1 shown in FIGS. 1 to 3 the projecting portions 9 and 10 are arranged in opposite positions with respect to the first spherical joint 3. In FIG. 3, the first projecting portion 9 is in an upper position and the second projecting portion 10 in a lower position with respect to the first spherical joint 3.

Figure 4:
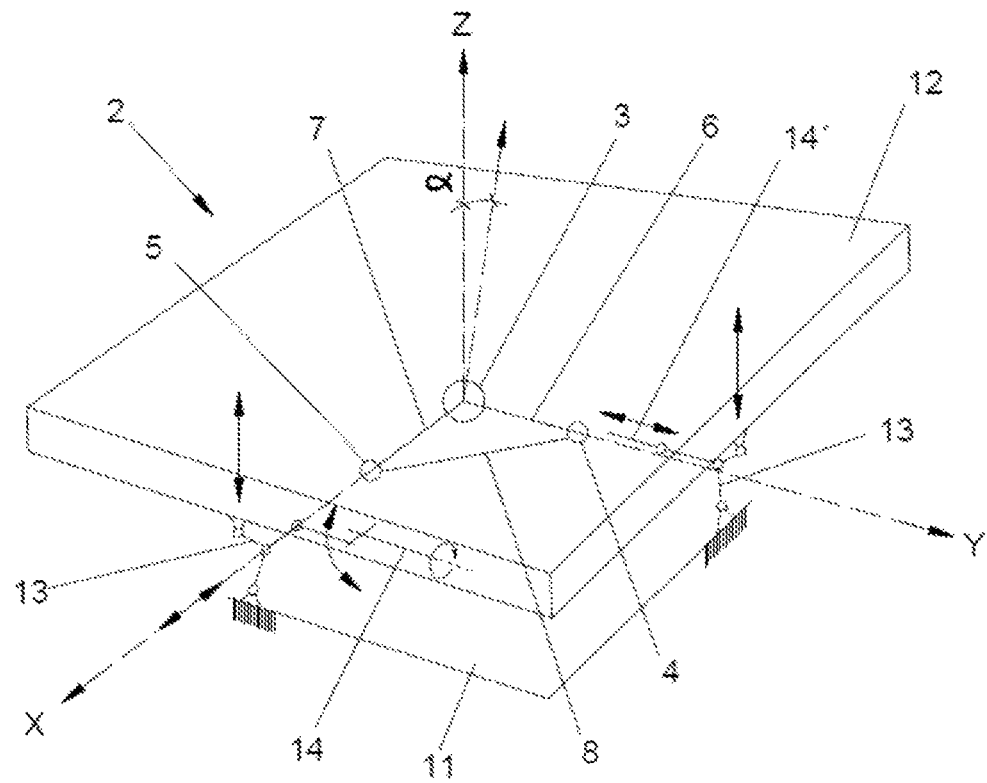
FIG. 4 is a schematic diagram of the articulated pointing system of the invention.
Figure 5:
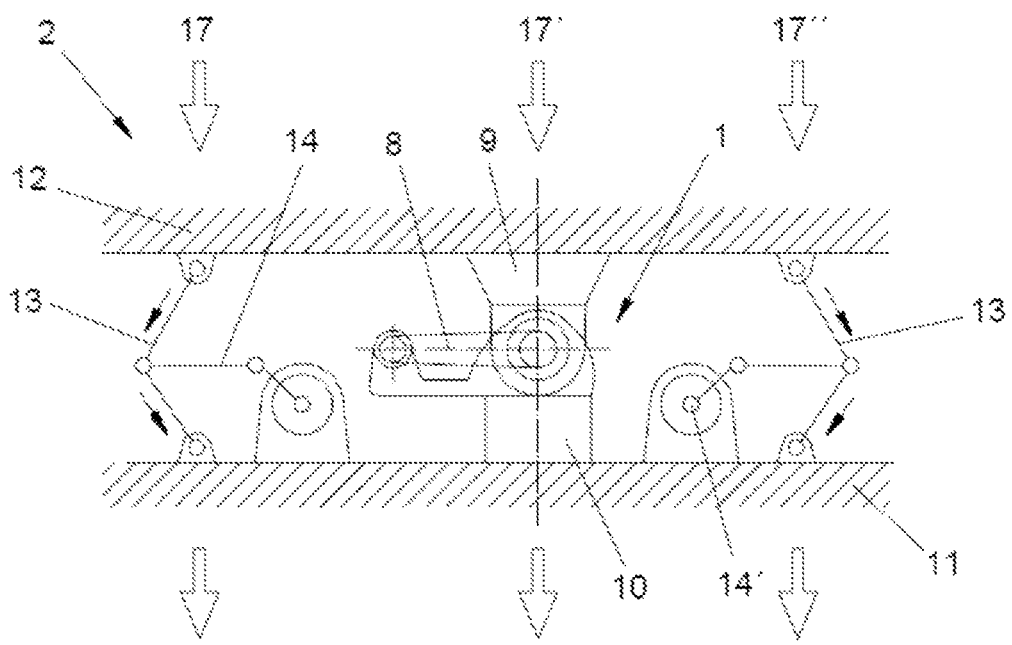
FIG. 5 shows a schematic front view of the articulated pointing system of the invention with the main load paths.

FIGS. 4 and 5 show an articulated pointing system 2 of the invention, that comprises a basement platform 11 and a mobile platform 12 which is movable with respect to the basement platform 11. The articulated pointing system 2 also comprises two articulated hinge means 13 that join the basement platform 11 and the mobile platform 12, the movement of the hinge means 13 being performed by actuators 14, 14'. The articulated pointing system 2 additionally comprises an articulated mechanism 1 of the above described type in which the first lever 6 is attached to the mobile platform 12 through the first projecting portion 9 and the second lever 7 is attached to the basement platform 11 through the second projecting portion 10.

FIG. 4 also shows the orthogonal system of axes X, Y, Z (axes X and Y have already been defined).

As it can be seen in FIG. 4, the articulated pointing system 2 has a basement platform 11 and a mobile platform 12 which is movable with respect to the basement platform 11, such that it can change its orientation and pointing with respect to the basement platform 11. The change of relative orientation (for instance, angle α) is performed by moving two hinge means 13 with respect to a central articulation constituted by the articulated mechanism 1. The movement of the hinge means 13 is performed by rotational actuators 15 or by linear actuators 16.

By moving the actuator 14 the hinge articulation is moved, and the paddles of the hinge transmit the X axis linear movement in Z axis linear movement, moving the mobile platform 12 up and down, and rotating the platform around Y axis.

As stated, the rotation axes X and Y are defined by the spherical joints:

The first spherical joint 3 and the second spherical joint 4 are linked by the first lever 6, the axis Y being the longitudinal axis of the first lever 6.

The first spherical joint 3 and the third spherical joint 5 are linked by the second lever 7, the axis X being the longitudinal axis of the second lever 7.

The perpendicularity of axes X and Y and a cardan type movement is guaranteed by the lever 8 linking the second spherical joint 4 and the third spherical joint 5.

The arrangement of the central articulation collects the benefits of a spherical bearing joint with the benefits of a cardan type joint. Three spherical joints 3, 4, 5 define the rotation axes X, Y and the links between them define the coupled movement. One axis (Z) is fixed and the other two axes (X and Y) move around the fixed axis (Z). The interface plane can be placed in any orientation through the rotation around both axes (X, Y).

FIG. 5 also shows the three load paths 17, 17', 17" between the mobile platform 12 and the basement platform 11 that take place when loads (represented by arrows) are exerted on the mobile platform 12. The actuators 14, 14' are arranged out of these load paths 17, 17', 17". This arrangement provides an increase of the output resolution (platform orientation), leaving the hinges 13 (structural members) in the corresponding load paths 17, 17". This feature allows the optimization of the articulated pointing system 2 from the point of view of load capability (the load capability of the system can be increased using the same actuator without increasing the mass) and also from the point of view of costs (it allows the selection of the actuator from a wider range of actuators).

Figure 6:
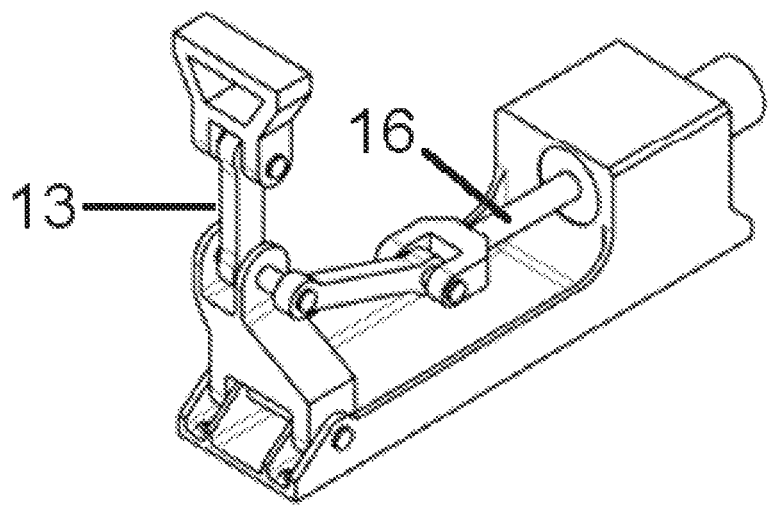
FIGS. 6 and 7 are views showing the actuators and the hinge means of the articulated pointing system of the invention.

FIG. 6 shows the hinge means 13 of the articulated pointing system 2 of the invention with a linear actuator 16.

Figure 7:
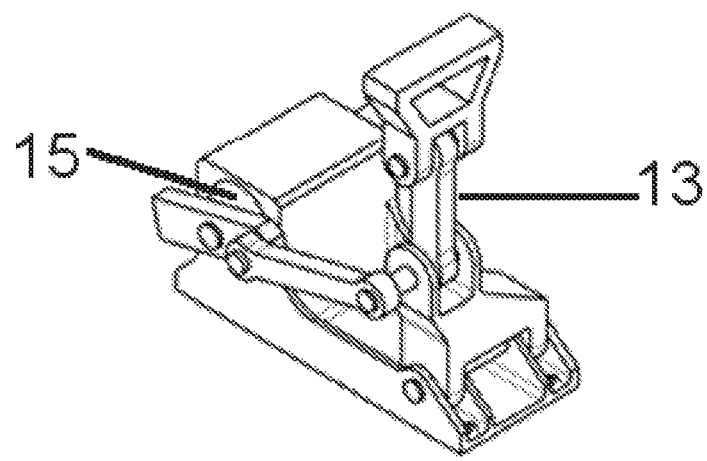

FIG. 7 shows the hinge means 13 of the articulated pointing system 2 of the invention with a rotational actuator 15.

Rotational actuators 15 can be placed with the rotation axis parallel to the basement platform 11 or normal to the basement platform 11. Linear actuators 16 are placed parallel to the basement platform 11, Although the present invention has been fully described in connection with preferred embodiments, it is evident that modifications may be introduced within the scope thereof, not considering this as limited by these embodiments, but by the contents of the following claims.

The invention claimed is:

1. An articulated mechanism, comprising:
 a first spherical joint,
 a second spherical joint,
 a third spherical joint,
 a first lever,
 a second lever, and
 a third lever,
 wherein the first spherical joint and the second spherical joint are linked by the first lever, the first lever comprising a first projecting portion; the first spherical joint and the third spherical joint are linked by the second lever, the second lever comprising a second projecting portion projecting in an opposite direction to a direction in which the first projecting portion projects; and the second spherical joint and the third spherical joint are linked by the third lever, so that a longitudinal axis of the first lever and a longitudinal axis of the second lever are perpendicular.

2. Articulated pointing system, comprising:
 a basement platform; and
 a mobile platform which is movable with respect to the basement platform;
 two articulated hinges joining the basement platform and the mobile platform, movement of the hinges being performed by actuators;
 an articulated mechanism of claim 1 in which the first lever is attached to the mobile platform by the first projecting portion and the second lever is attached to the basement platform by the second projecting portion.

3. The articulated pointing system, according to claim 2, wherein the actuators are arranged out of load paths between the mobile platform and the basement platform that take place when loads are exerted on the mobile platform.

4. The articulated pointing system, according to claim 2, wherein the actuators are rotational actuators.

5. The articulated pointing system, according to claim 2, wherein the actuators are linear actuators.

\* \* \* \* \*